United States Patent
Matsuno (10) Patent No.: US 6,878,085 B2
(45) Date of Patent: Apr. 12, 2005

(54) POWER DISTRIBUTION CONTROL APPARATUS AND CONTROL METHOD

(75) Inventor: Koji Matsuno, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/634,802

(22) Filed: Aug. 6, 2003

(65) Prior Publication Data

US 2004/0026154 A1 Feb. 12, 2004

(30) Foreign Application Priority Data

Aug. 6, 2002 (JP) .................................. P. 2002-228997

(51) Int. Cl.⁷ .............................................. F16H 3/74
(52) U.S. Cl. ...................... 475/254; 477/35; 477/36; 477/176; 477/169; 701/69; 701/82; 701/89; 701/67; 701/51; 180/248; 180/249; 180/197
(58) Field of Search ....................... 475/245, 254; 701/69, 82, 89, 51, 67; 180/248, 249, 197; 477/35, 36, 176, 169

(56) References Cited

U.S. PATENT DOCUMENTS

| | | | | |
|---|---|---|---|---|
| 4,895,217 A | * | 1/1990 | Hueckler et al. | 180/233 |
| 5,004,064 A | * | 4/1991 | Tezuka et al. | 180/197 |
| 5,052,988 A | * | 10/1991 | Ishikawa et al. | 475/150 |
| 5,301,769 A | * | 4/1994 | Weiss | 180/249 |
| 5,332,059 A | * | 7/1994 | Shirakawa et al. | 180/197 |
| 5,742,917 A | * | 4/1998 | Matsuno | 701/69 |
| 5,752,211 A | * | 5/1998 | Takasaki et al. | 701/69 |
| 2002/0055416 A1 | | 5/2002 | Sakakiyama | |
| 2004/0078129 A1 | * | 4/2004 | Matsuno et al. | 701/67 |

FOREIGN PATENT DOCUMENTS

| | | |
|---|---|---|
| JP | 08-132914 | 5/1996 |
| JP | 2001-71776 | 3/2001 |

* cited by examiner

Primary Examiner—Saul Rodriguez
Assistant Examiner—David D. Le
(74) Attorney, Agent, or Firm—Smith, Gambrell & Russell (57) ABSTRACT

In a differential limiting torque control section, a target differential rotation speed between front and rear drive shafts is established according to a dial position inputted by a driver of a variable dial. Further, an actual differential rotation speed between front and rear drive shafts is calculated and a deviation between the target differential rotation speed and the actual differential rotation speed is calculated. Based on the deviation, a first differential limiting torque and based on a dial position of a variable dial a second differential limiting torque are calculated. Further, a third differential limiting torque is calculated based on the dial position and a throttle opening angle. A final differential limiting torque between front and rear drive shafts is obtained by summing up these first, second and third differential limiting torques.

13 Claims, 6 Drawing Sheets

POWER DISTRIBUTION CONTROL APPARATUS AND CONTROL METHOD

BACKGROUND OF THE INVENTION

1. Field of the Invention

The present invention relates to a vehicular power distribution control apparatus and control method and more particularly to a control apparatus and method for controlling driving force to be transmitted from one drive shaft to the other drive shafts.

2. Discussion of Related Arts

Generally, the power distribution control between front and rear wheels for four-wheel drive vehicles or the power distribution control between left and right wheels are performed by variably controlling an engagement force, namely a differential limiting torque, of a hydraulically operated multiple-disc friction clutch and the like. The differential limiting control produces a large change in a vehicle maneuverability, depending upon its control characteristic. Further, in case of the differential limiting control having identical control logics and control constants, the maneuverability of a vehicle also varies according to the aged deterioration of tires or the difference of road conditions.

Japanese Patent Application Laid-open No. Toku-Kai-Hei 8-132914 discloses a technology of a vehicular torque distribution apparatus in which a driver directly establishes a differential limiting torque by manual operation based on the driver's judgment of road and traveling conditions to obtain a discretional torque distribution.

However, in order to realize a vehicle maneuverability as intended by a driver, the differential limiting torque must be properly changed according to road conditions or miscellaneous traveling conditions. Accordingly, it is difficult to coincide the manually inputted differential limiting torque with a proper torque in order to obtain an optimum maneuverability.

SUMMARY OF THE INVENTION

It is an object of the present invention to provide a vehicular power distribution control apparatus capable of realizing an optimum maneuverability suitable for traveling conditions and road conditions while reflecting the intention of a driver.

To attain the object, a power distribution control apparatus for distributing an input torque transmitted through an input shaft into a first output torque and a second output torque through a first output shaft and a second output shaft, respectively by means of a differential gear unit and for controlling a distribution ratio of the first output torque to the second output torque by controlling an engagement force of a clutch mechanism provided between the first output shaft and the second output shaft, comprises target differential rotation speed establishing means for selectively establishing a target differential rotation speed between the first and second output shafts, actual differential rotation speed detecting means for detecting an actual differential rotation speed between the first and second output shafts and differential limiting torque establishing means for selectively establishing a differential 8 limiting torque of the clutch at least based on the target differential rotation speed, the actual differential rotation speed and a deviation between the target differential rotation speed and the actual differential rotation speed. Further, more specifically, the differential limiting torque establishing means includes first differential limiting torque calculating means for calculating a first differential limiting torque at least based on a time-versus integration of the deviation, second differential limiting torque calculating means for calculating a second differential limiting torque based on the deviation and a proportional term gain selectively established, and a third differential limiting torque establishing means for selectively establishing an initial torque at least based on a throttle opening angle and establishes the differential limiting torque by summing up the first differential limiting torque, the second differential limiting torque and the initial torque.

DETAILED DESCRIPTION OF THE PREFERRED EMBODIMENTS

Figure 1:
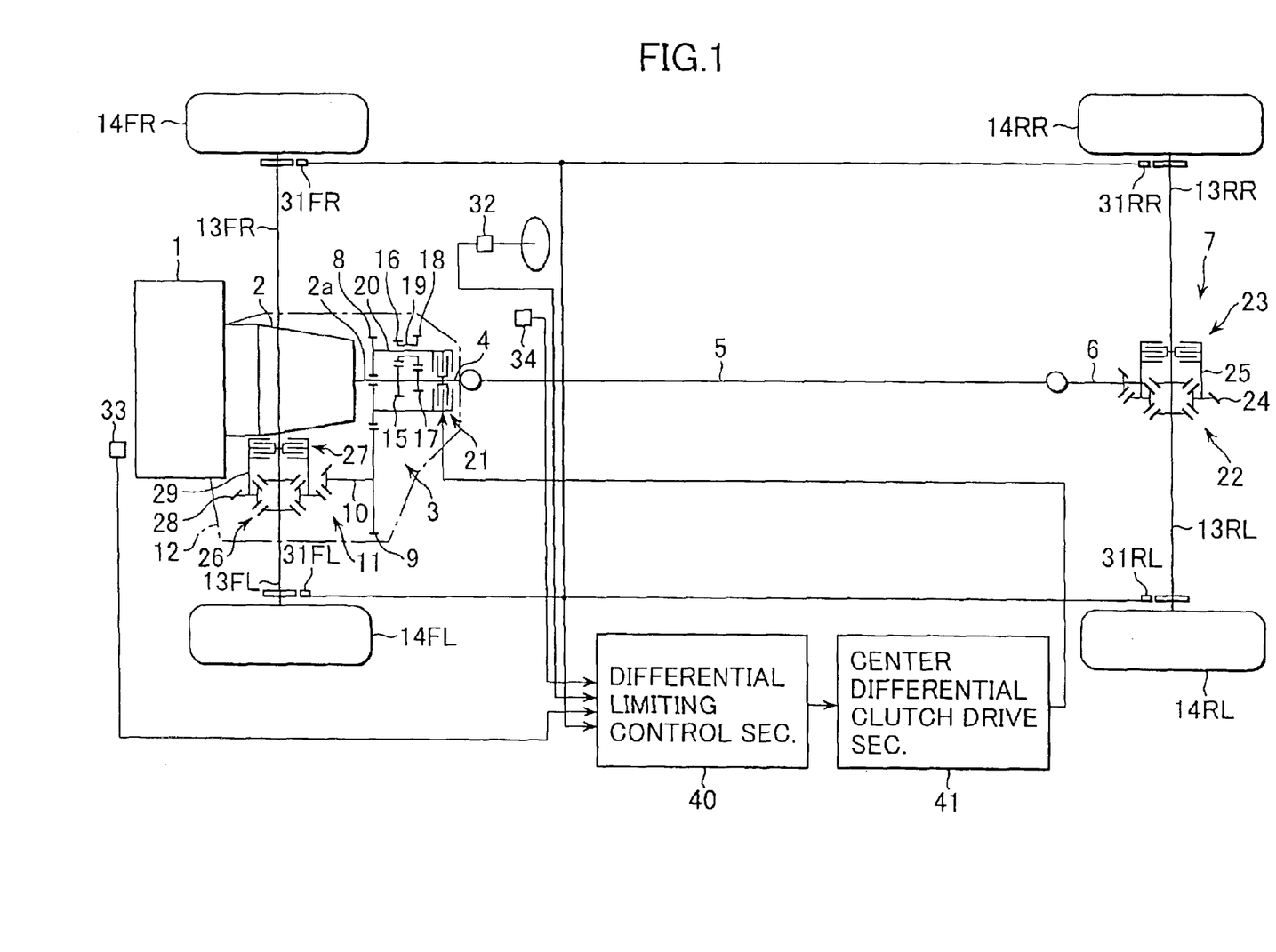
FIG. 1 is a schematic skeleton diagram showing a power train and a power distribution control apparatus for a vehicle according an embodiment of the present invention.

Referring now to FIG. 1, reference numeral 1 denotes an engine mounted on a front part of a vehicle. Driving force of the engine 1 is transmitted to a center differential 3 through an automatic transmission 2 (including a torque converter) and a transmission output shaft 2a. Further, the driving force of the engine 1 inputs from the center differential 3 to a rear final reduction gear unit 7 through a rear drive shaft 4, a propeller shaft 5 and a drive pinion 6 and on the other hand the driving force inputs from the center differential 3 to a front final reduction gear unit 11 through a transfer drive gear 8, a transfer driven gear 9 and a front drive shaft 10. The automatic transmission 2 is accommodated integrally with the center differential 3 and the front final reduction gear unit 11 in a casing 12.

The driving force inputted to the rear final reduction gear unit 7 is transmitted to a rear left wheel 14RL and a rear right wheel 14RR through a rear left drive shaft 13RL and a rear right drive shaft 13RR, respectively. Further, the driving force inputted to the front final reduction gear unit 11 is transmitted to a front left wheel 14FL and a front right wheel 14FR through a front left axle shaft 13FL and a front right axle shaft 13FR, respectively.

The center differential 3 incorporates a first sun gear 15 having a large diameter and mounted on the transmission output shaft 2a. The first sun gear 15 meshes with a first pinion 16 having a small diameter, thus a first gear train being constituted.

Further, a second sun gear 17 having a small diameter is mounted on the rear drive shaft 4 from which power is transmitted to rear wheels and meshes with a second pinion 18 having a large diameter, thus a second gear train being constituted.

The first pinion 16 and the second pinion 18 are integrally formed with a pinion member 19 which is rotatably supported by a fixed shaft provided in a carrier 20. Further, the carrier 20 is connected at the front thereof with the transfer drive gear 8 from which power is transmitted to the front wheels.

Further, the carrier 20 is rotatably fitted at the front section thereof over the output shaft 2a of the transmission 2 and is rotatably fitted at the rear section thereof over the rear drive shaft 4. Further, the first and second sun gears 15, 17 are accommodated in the central space of the carrier 20. In FIG. 1, only one pinion member 19 is illustrated, however in an actual construction, plural pinion members 19 are provided around the sun gears 15, 17.

Thus, the center differential 3 is formed as a compound planetary gear unit having an input member in the transmission shaft 2a, an output member in the rear drive shaft 4 and the other output member in the carrier 20.

The center differential 3 of a compound planetary type is provided with a differential function by properly establishing the number of teeth of the first and second sun gears 15, 17 and the first and second pinions 16, 18.

Further, the center differential 3 is furnished with a desired base torque distribution, for example an unequal torque distribution biased on rear wheels, by appropriately establishing working pitch circles of the first and second sun gears 15, 17 and the first and second pinions 16, 18.

Further, the center differential 3 is designed in such a manner that the first and second sun gears 15, 17 and the first and second pinions 16, 18 have helical teeth, respectively, leaving thrust loads. As a result, the thrust loads produce a friction torque at an end of the respective pinion members 19. Further, a resultant force of separation force and tangential force generated by meshing of the gears exerts on the fixed shaft provided in the carrier 20, producing another friction torque between the respective pinion members 19 and the respective fixed shafts. Since these friction torques are obtained as a differential limiting torque which is proportional to the input torque, a differential limiting function is given to the center differential 3 itself.

Further, there is provided a center differential clutch (transfer clutch) 21 of a hydraulic multiple disc clutch type for varying the front-to-rear torque distribution between two output members, the carrier 20 and the rear drive shaft 4, of the center differential 3. When the engagement force of this transfer clutch 21 is adjusted, the front-to-rear torque distribution ratio can be varied from 50:50 in a fully engaged condition to an inherent front-to-rear torque distribution ratio, for example 35:65, of the center differential 3 in a released condition.

The transfer clutch 21 is connected with a center differential clutch drive section 41 constituted by a hydraulic circuit including a plurality of solenoid valves. Hydraulic pressure generated in the center differential clutch driving section 41 actuates a piston (not shown) to engage or release the transfer clutch 21. Further, control signals for driving the center differential clutch drive section 41, that is, input signals to the respective solenoid valves, are outputted from a differential limiting control section 40.

The rear final reduction gear unit 7 comprises a differential mechanism 22 using bevel gears and a rear differential clutch 23 using a multiple disc clutch. The rear differential clutch 23 is provided between a differential case 25 to which a ring gear 24 is fixed and a rear right axle shaft 13RR. The ring gear 24 meshes with the drive pinion 6 to drive the differential mechanism 22.

The front final reduction gear unit 11 is constituted by a differential mechanism 26 of bevel gear type and a front disc clutch 27 using multiple discs in the same manner as the rear final reduction gear unit 7. The front disc clutch 27 is provided between a differential case 29 to which a ring gear 28 is fixed and a front right axle shaft 13FR. The ring gear 28 meshes with a drive pinion of the front drive shaft 10 to drive the differential mechanism 26.

The differential limiting control section 40 inputs parameters necessary for control from respective sensors and switches. Wheel speeds of the wheels, 14FL, 14FR, 14RL and 14RR are detected by wheel speed sensors 31FL, 31FR, 31RL and 31RR respectively and are inputted to the differential limiting control section 40. Further, a steering wheel angle detected by a steering wheel angle sensor 32 and a throttle opening angle detected by a throttle opening angle sensor 33 are inputted to the differential limiting control section 40, respectively. Further, a variable dial 34 is disposed in an accessible position to a driver to establish a differential limiting torque within a range between a "differential open" position and a "differential lock" position. When the driver adjusts the variable dial 34 to a desired position, a signal corresponding to that position inputs to the differential limiting control section 40.

Figure 2:
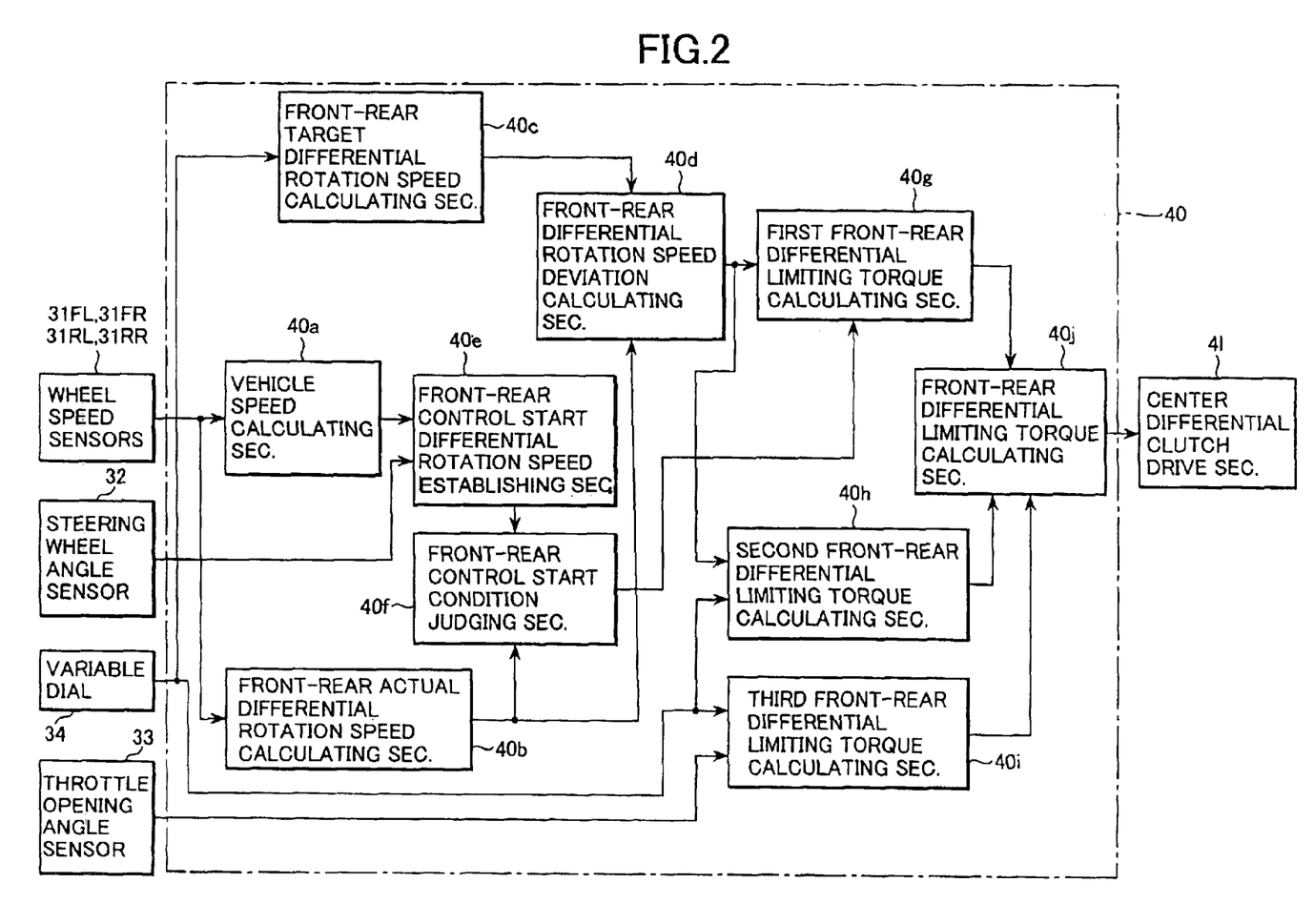
FIG. 2 is a functional block diagram showing a differential limiting torque control section of a center differential according to the embodiment of the present invention.

The differential limiting control section 40 is constituted by a micro-computer and its interface circuits. As shown in FIG. 2, a vehicle speed calculating section 40a, a front-rear actual differential rotation speed calculating section 40b, a front-rear target differential rotation speed calculating section 40c, a front-rear differential rotation speed deviation calculating section 40d, a front-rear control start differential rotation speed establishing section 40e, a front-rear control start condition judging section 40f, a first front-rear differential limiting torque calculating section 40g, a second front-rear differential limiting torque calculating section 40h, a third front-rear differential limiting torque calculating section 40i and a front-rear differential limiting torque calculating section 40j.

The vehicle speed calculating section 40a inputs wheel speeds ωfl, ωfr, ωrl, ωrr of the wheels 14FL, 14FR, 14RL, 14RR from the wheel speed sensors 31FL, 31FR, 31RL, 31RR, respectively. A vehicle speed V is calculated by averaging these wheel speeds and is outputted to the front-rear control start differential rotation speed calculating section 40e.

The front-rear actual differential rotation speed calculating section 40b inputs the wheel speeds ωfl, ωfr, ωrl, ωrr of the wheels 14FL, 14FR, 14RL, 14RR from the wheel speed sensors 31FL, 31FR, 31RL, 31RR, respectively and calculates an actual differential rotation speed Δωctr between front and rear drive shafts according to the following formula (1). The front-rear actual differential rotation speed calculating section 40b acts as actual differential rotation speed detecting means in the differential limiting control of the center differential.

$$\Delta\omega ctr = ((\omega fl + \omega fr)/2) - ((\omega rl + \omega rr)/2) \qquad (1)$$

The actual differential rotation speed Δωctr between front and rear drive shafts calculated in the front-rear actual differential rotation speed calculating section 40b is outputted to the front-rear differential rotation speed deviation calculating section 40*d* and the front-rear control start condition judging section 40*f*, respectively.

The front-rear target differential rotation speed establishing section 40*c* inputs a signal indicative of a dial position of the variable dial 34 and establishes a front-rear target differential rotation speed Δωctrt by referring to a table showing the relationship between dial position and front-rear target differential rotation speed Δωctrt.

Figure 3:
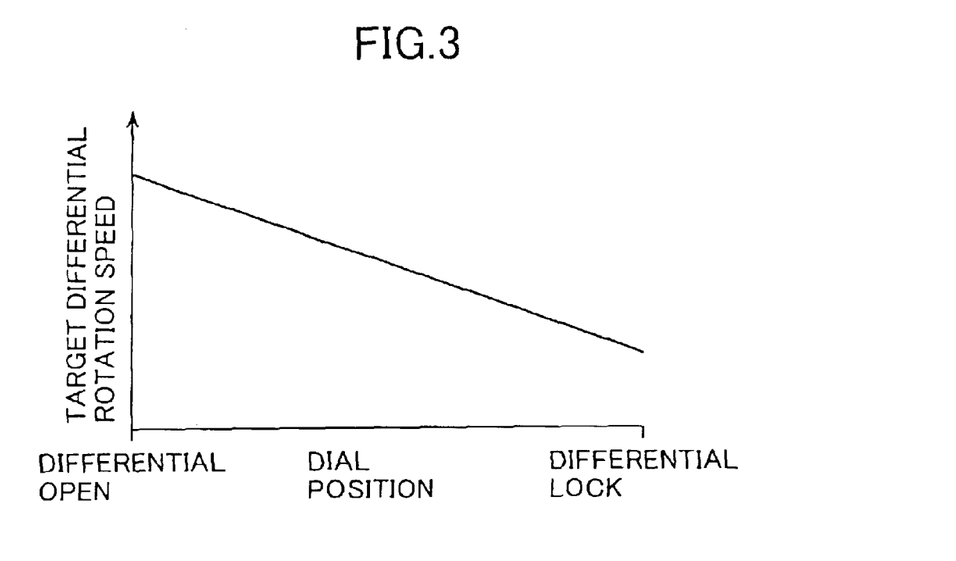
FIG. 3 is a table showing the relationship between a dial position and a target differential rotation speed.

FIG. 3 is an example of the table which is obtained from prior experiments and calculations. In case where a driver prefers a crispy driving and enjoys a good turning ability, the variable dial 34 is set to a "differential open" position so as to establish the front-rear target differential rotation speed Δωctrt at a large value. On the other hand, in case where the driver prefers a steady and safe driving, the variable dial 34 is set to a "differential lock" position so as to establish the front-rear target differential rotation speed Δωctrt at a small value. The front-rear target differential rotation speed Δωctrt may be corrected by the vehicle speed V in such a manner that as the vehicle speed V becomes large, the front-rear target differential rotation speed Δωctrt becomes smaller.

The front-rear target differential rotation speed Δωctrt established at the front-rear target differential rotation speed establishing section 40*c* is outputted to the front-rear differential rotation speed deviation calculating section 40*d*. The front-rear target differential rotation speed establishing section 40*c* serves as target differential rotation speed establishing means in the differential limiting control of the center differential.

The front-rear differential rotation speed deviation calculating section 40*d* calculates a deviation (front-rear differential rotation speed deviation) εctr based on the actual differential rotation speed Δωctr between the front and rear drive shafts inputted from the front-rear actual differential rotation speed calculating section 40*b* and the target differential rotation speed Δωctrt inputted from the front-rear target differential rotation speed establishing section 40*c* according to the following formula (2) and is outputted to the first front-rear differential limiting torque calculating section 40*g* and the second front-rear differential limiting torque calculating section 40*h*, respectively.

$$\epsilon ctr = \Delta \omega ctr - \Delta \omega ctrt \quad (2)$$

The front-rear control start differential rotation speed establishing section 40*e* inputs a vehicle speed V from the vehicle speed calculating section 40*a* and establishes a front-rear control start differential rotation speed Δωctrs by reference to a table indicating the relationship between front-rear control start differential rotation speed Δωctrs. That relationship is obtained from prior experiments and calculations.

Figure 4:
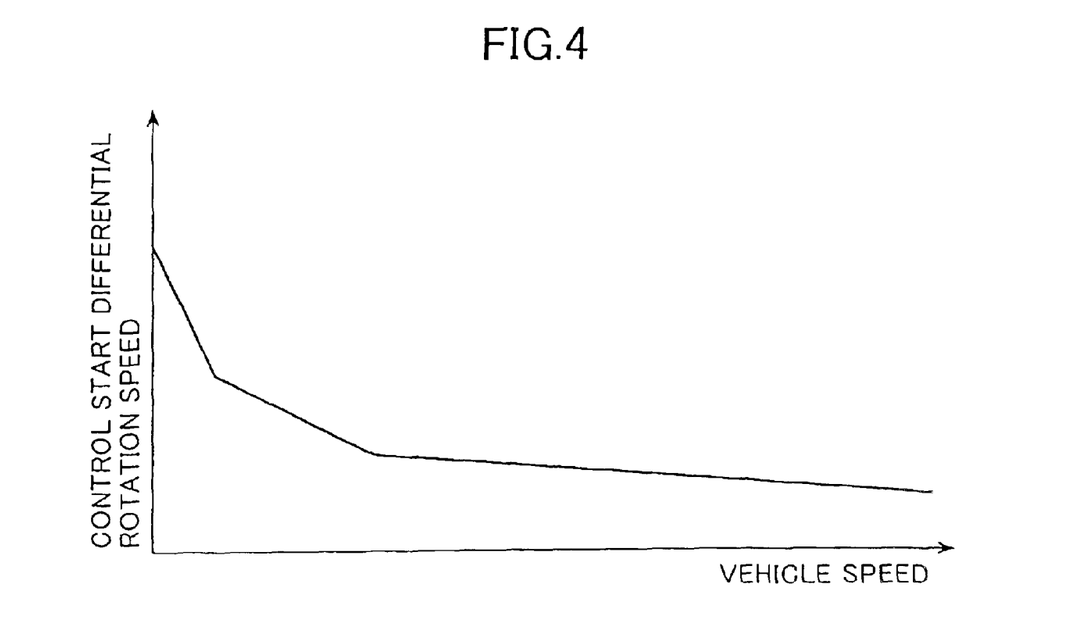
FIG. 4 is a table showing the relationship between a vehicle speed and a control start differential rotation speed.

This front-rear control start differential rotation speed Δωctrs is established to a smaller value than the front-rear target differential rotation speed Δωctrt, for example, a lower limit value of the actual differential rotation speed Δωctr between front and rear drive shafts. The front-rear control start differential rotation speed Δωctrs is established by referring to a table as shown in FIG. 4. The table is prepared based on vehicle specifications in consideration of miscellaneous errors encountered in actual traveling.

Figure 5:
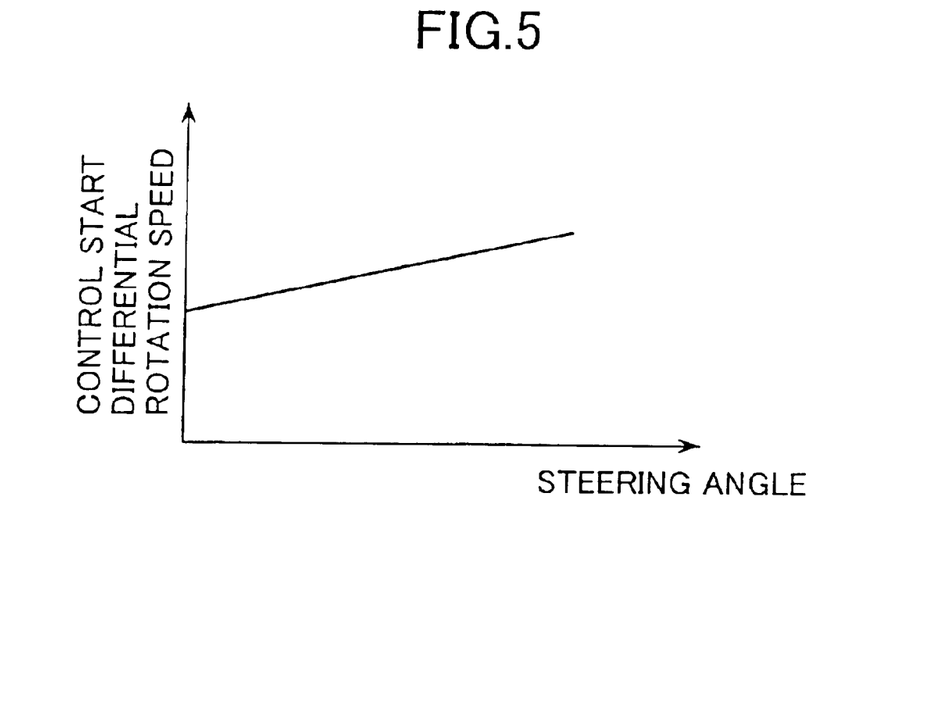
FIG. 5 is a table showing the relationship between a steering angle and a control start differential rotation speed.

Further, according to the embodiment of the present invention, the front-rear control start differential rotation speed establishing section 40*e* inputs a signal indicative of a steering wheel angle from the steering wheel angle sensor 32. The front-rear control start differential rotation speed Δωctrs established in accordance with the vehicle speed V is corrected by the steering angle such that as the steering angle becomes large, the front-rear control start differential rotation speed Δωctrs becomes larger as shown in FIG. 5. Thus established front-rear control start differential rotation speed Δωctrs is outputted to the front-rear control start condition judging section 40*f*.

The front-rear control start condition judging section 40*f* inputs the front-rear actual differential rotation speed Δωctr and the front-rear control start differential rotation speed Δωctrs from the front-rear differential rotation speed calculating section 40*b* and the front-rear control start differential rotation speed establishing section 40*e*, respectively and compares the front-rear actual differential rotation speed Δωct with the front-rear control start differential rotation speed Δωctrs to judge whether or not the start condition of differential control is satisfied.

In case where the front-rear actual differential rotation speed Δωctr is larger than the front-rear control start differential rotation speed Δωctrs, the front-rear control start condition judging section 40*f* judges that the start condition of differential control has been satisfied and outputs the judgment to the first front-rear differential limiting torque calculating section 40*g*.

The first front-rear differential limiting torque calculating section 40*g* inputs a front-rear differential rotation speed deviation εctr and the result of the judgment of the control start from the front-rear differential rotation speed deviation calculating section 40*d* and the front-rear control start condition judging section 40*f*, respectively and calculates a first front-rear differential limiting torque Tsmcctr according to the following formulas (3) and (4):

$$sctr = \epsilon ctr + kictr \cdot \int (\epsilon ctr) dt \quad (3)$$

where integration is performed from 0 to t; kictr is integral term gain.

$$X = kwctr \cdot jwctr \cdot (d\epsilon ctr/dt) + Tsgctr \cdot (sctr/(|sctr| + \delta ctr)) \quad (4)$$

where kwctr is differential term gain; jwctr is inertia term; Tsgctr is changeover gain; and δctr is constant to give continuity to differential limiting force for the purpose of preventing chattering.

In case of X>0, the first front-rear differential limiting torque Tsmcctr is let be equal to X and in case of X≤0, the first front-rear differential limiting torque Tsmcctr is let be 0. Further, in case where the control start condition is not satisfied (Δωctr≤Δωctrs), letting Tsmcctr=0, ∫(εctr)dt is reset to 0.

That is, in case where the front-rear actual differential rotation speed Δωctr is smaller than the front-rear control start differential rotation speed Δωctrs, which is a lower limit of the front-rear actual differential rotation speed Δωctr, the first front-rear differential limiting torque Tsmcctr is let be 0 in order to avoid a condition that the transfer clutch 21 is locked up due to a static friction coefficient. Further, the integration term is prevented from becoming an excessively low value by resetting the integration term ∫(εctr)dt to 0. if the integration term is too low, when the transfer clutch 21 starts to slip again, the control lag increases and as a result "stick and slip" phenomenon is promoted. Thus calculated first front-rear differential limiting torque Tsmcctr is outputted to the front-rear differential limiting torque calculating section 40*j*.

The second front-rear differential limiting torque calculating section 40*h* inputs a front-rear differential rotation speed deviation εctr and a signal indicative of a dial position from the front-rear differential rotation speed deviation calculating section 40*d* and the variable dial 34, respectively and calculates a second front-rear differential limiting torque Tpcctr according to the following formula (5).

$$Tpcctr = kpctr \cdot \epsilon ctr \qquad (5)$$

Where kpctr is proportional term gain which is established by referring to a table prepared beforehand according to the dial position of the variable dial 34.

Figure 6:
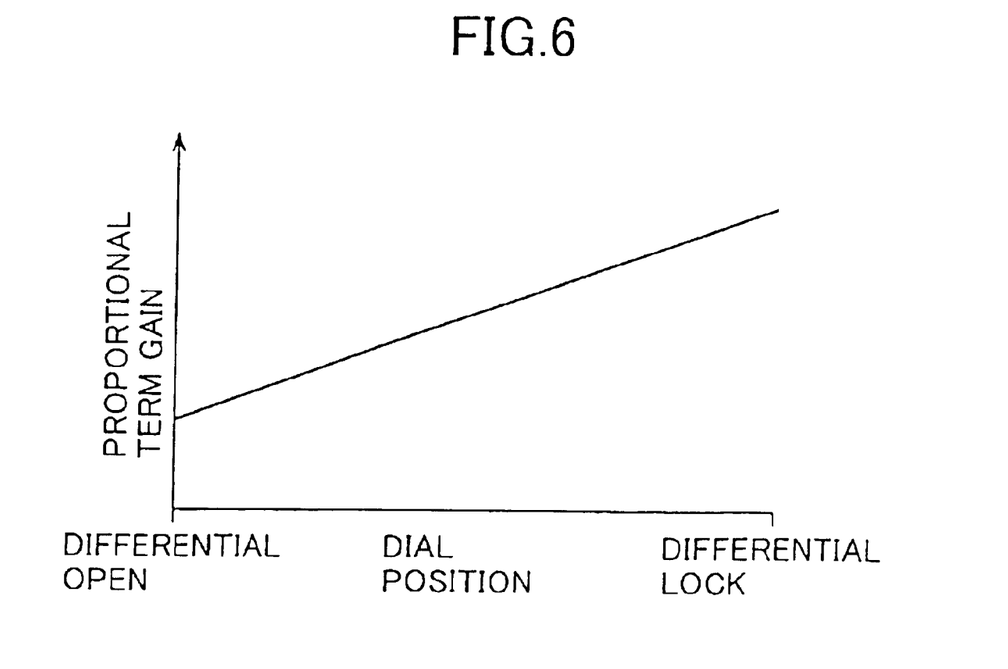
FIG. 6 is a table showing the relationship between a dial position and a proportional term gain.

The table is shown in FIG. 6. In which, the proportional term gain kpctr is established to a small value so as to decrease the second front-rear differential limiting torque Tpcctr in case where the variable dial 34 is set on a "differential open" side (crispy driving side based on a good turning ability). On the other hand, in case where the variable dial 34 is set on a "differential lock" side (steady and safe driving side), the proportional term gain kpctr is established to a large value so as to increase the second front-rear differential limiting torque Tpcctr. Thus calculated second front-rear differential limiting torque Tpcctr is outputted to the front-rear differential limiting torque calculating section 40*j*.

The third front-rear differential limiting torque calculating section 40*i* inputs a throttle opening angle and a signal corresponding to a dial position from the throttle opening angle sensor 33 and the variable dial 34, respectively and establishes a third front-rear differential limiting torque Ti as an initial torque based on these parameters by referring to a table determined by experiments and calculations beforehand.

Figure 7:
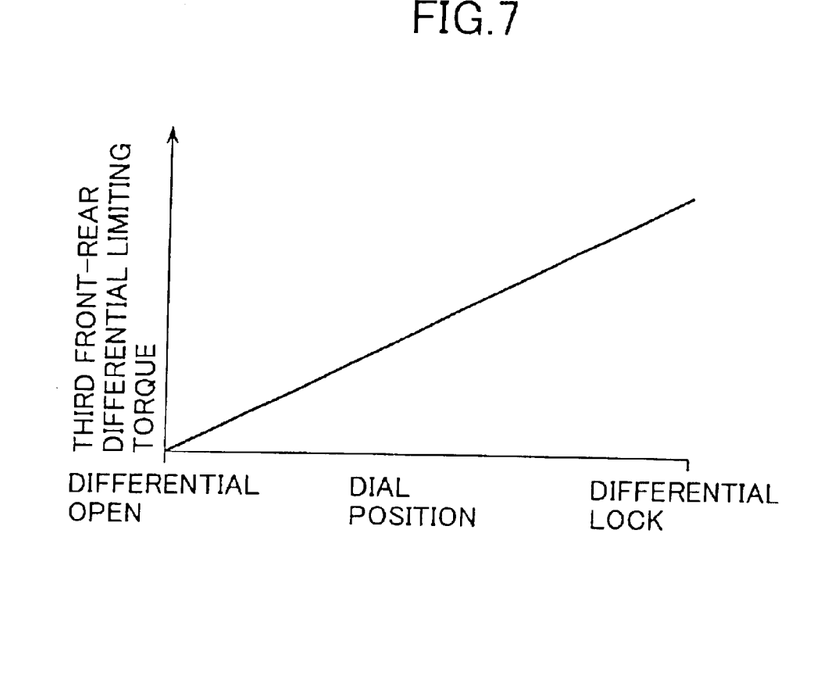
FIG. 7 is a table showing the relationship between a dial position and a third differential limiting torque.
Figure 8:
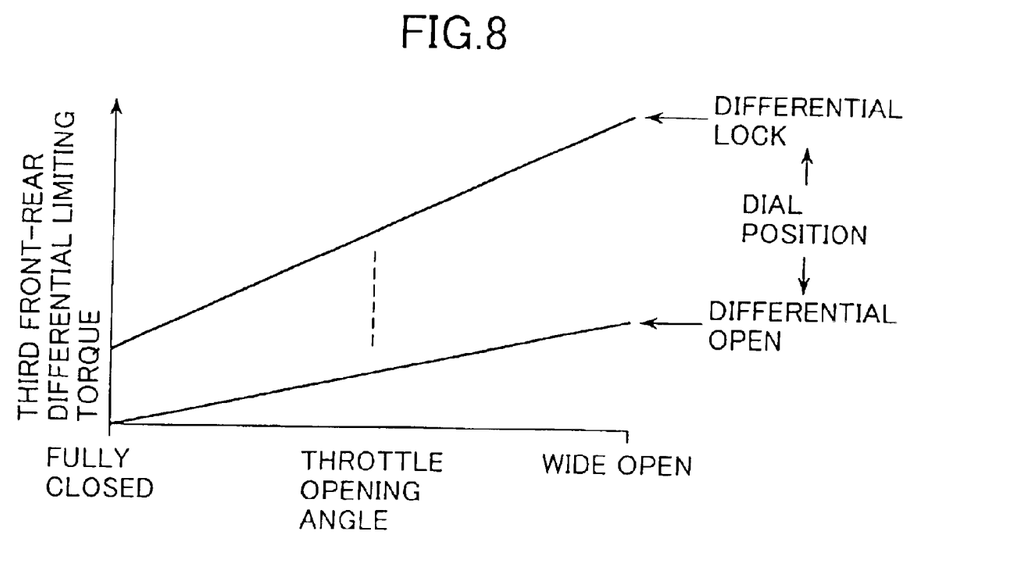
FIG. 8 is a table showing the relationship between a throttle opening angle and a third differential limiting torque.

According to the table, as shown in FIG. 7, when the dial is set on a "differential open" side (crispy driving side), the third front-rear differential limiting torque or the initial torque Ti is established to a small value and when the dial is set on a "differential lock" side (steady and safe driving side), the initial torque Ti is established to a large value. Further, as the throttle opening angle becomes large, the initial torque Ti is established to a larger value according to a table shown in FIG. 8. Thus obtained initial torque Ti is added to the first and second front-rear differential limiting torques as will be described hereinafter. The addition of the initial torque Ti enables to enhance the stability in traveling on a road surface with low friction coefficient. The third front-rear differential limiting torque or initial torque Ti is outputted to the front-rear differential limiting torque calculating section 40*j*.

The front-rear differential limiting torque calculating section 40*j* inputs the first front-rear differential limiting torque Tsmcctr, the second front-rear differential limiting torque Tpcctr and the initial torque Ti from the first front-rear differential limiting torque calculating section 40*g*, the second front-rear differential limiting torque calculating section 40*h* and the third front-rear differential limiting torque calculating section 40*i*, respectively and calculates a final front-rear differential limiting torque Tlsdctr according to the following formula (6).

$$Tlsdctr = Tsmcctr + Tpcctr + Ti \qquad (6)$$

Then, the front-rear differential limiting torque calculating section 40*j* outputs a signal indicative of hydraulic pressure for producing this final front-rear differential limiting torque Tlsdctr to the center differential clutch drive section 41.

According to the embodiment, differential limiting toque calculating means are constituted by the front-rear differential rotation speed deviation calculating section 40*d*, the first front-rear differential limiting torque calculating section 40*g*, the second front-rear differential limiting torque calculating section 40*h*, the third front-rear differential limiting torque calculating section 40*i* and the front-rear differential limiting torque calculating section 40*j*.

Figure 9:
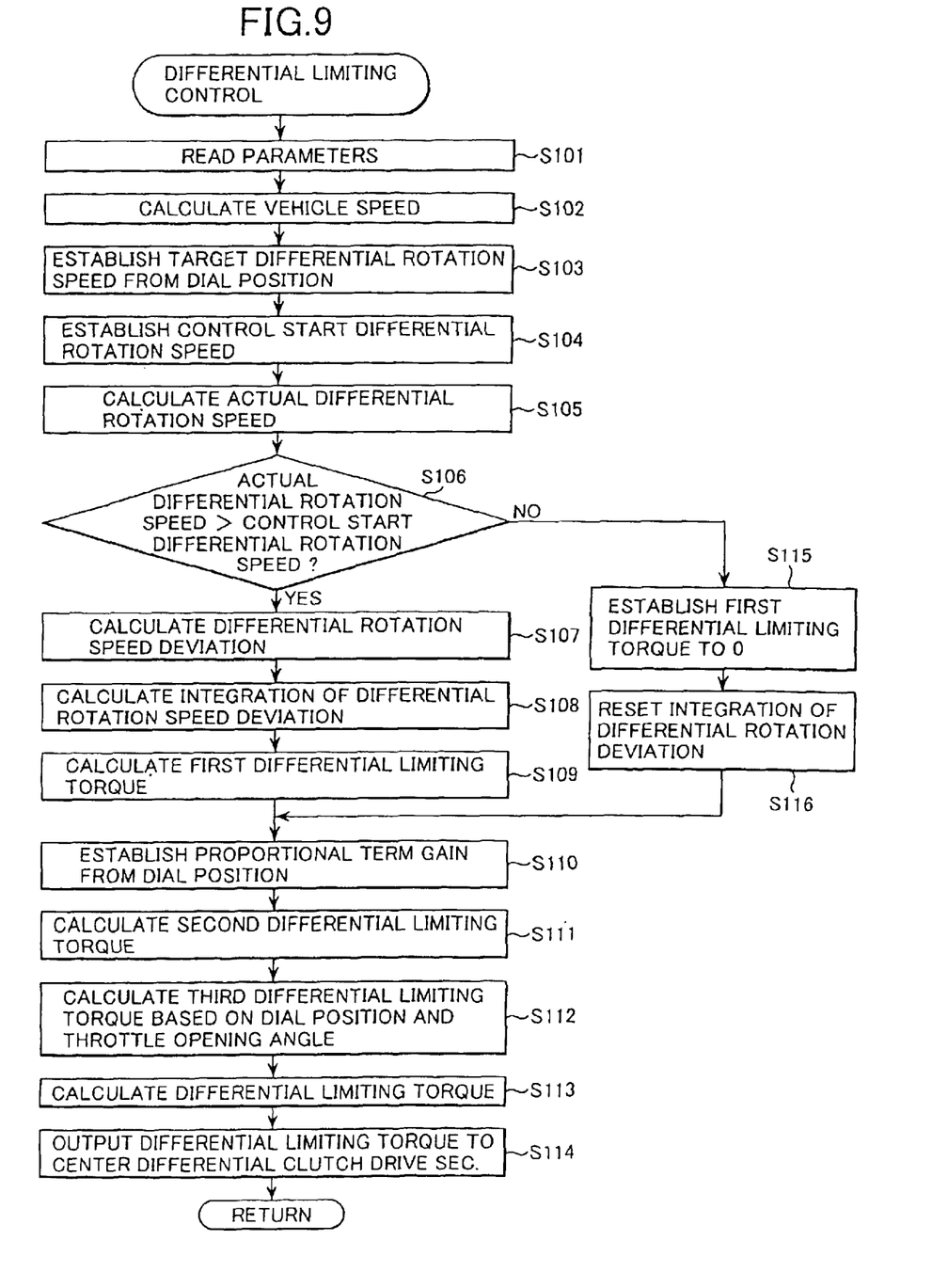
FIG. 9 is a flowchart showing a differential limiting torque control program of a center differential.

Now, a flow of the processes in the differential limiting control section 40 will be described by reference to a flowchart shown in FIG. 9.

First, at a step (hereinafter abbreviated as "S") 101, wheel speeds ωfl, ωfr, ωrl, ωrr of the respective wheels, 14FL, 14FR, 14RL, 14RR, a steering wheel angle, a throttle opening angle, a dial position indicated by a driver and the like, are read.

Then, the program goes to S102 where a vehicle speed is calculated in the vehicle speed calculating section 40*a* and goes to S103 where a front-rear target differential rotation speed Δωctrt is established in the front-rear target differential rotation speed establishing section 40*c* by referring to a map parameterizing dial position and front-rear target differential rotation speed Δωctrt.

Next, the program goes to S104 where a front-rear control start differential rotation speed Δωctrs is established by referring to a map parameterizing vehicle speed and front-rear control start differential rotation speed Δωctrt after being corrected by the steering wheel angle.

The program goes to S105 where an actual differential rotation speed Δωctr between front and rear drive shafts is calculated in the front-rear actual differential rotation speed calculating section 40*b* according to the formula (1).

After that, the program goes to S106 where the front-rear actual differential rotation speed Δωctr is compared with the front-rear control start differential rotation speed Δωctrs in the front-rear control start condition judging section 40*f* and when it is judged that the control start condition is satisfied, goes to S107.

At S107, a front-rear a front-rear differential rotation speed deviation εctr is calculated in the front-rear differential rotation speed deviation calculating section 40*d* according to the formula (2) and the program goes to S108.

At S108, the front-rear differential rotation speed deviation εctr is integrated from 0 to t in the first front-rear differential limiting torque calculating section 40*g* and the program goes to S109 where a first front-rear differential limiting torque Tsmcctr is calculated in the same differential limiting torque calculating section 40*g*. The first front-rear differential limiting torque Tsmcctr depends upon X calculated in the formula (4). In case of X>0, the first front-rear differential limiting torque Tsmcctr is let be equal to X and in case of X≦0, the first front-rear differential limiting torque Tsmcctr is let be 0. Then the program goes to S110.

On the other hand, in case where at S106 the front-rear differential rotation speed Δωctr is smaller than the front-rear control start differential rotation speed Δωcts, it is judged that the control start condition is not satisfied and the program goes to S115. At S115, the front-rear differential limiting torque Tsmcctr is established to 0, Then the program goes to S116 where the integral of the εctr is reset to 0 and goes to S110.

When the program goes from S109 or S116 to S110, a proportional term gain kpctr is established by reference to the table of the proportional term gain in the second front-rear differential limiting torque calculating section 40*h* and the program goes to S111 where a second front-rear differential limiting torque Tpcctr, namely, a proportional term is calculated according to the formula (5).

Next, the program goes to S112 where a third front-rear differential limiting torque, namely, an initial torque Ti is calculated based on the throttle opening angle and the dial position in the front-rear differential limiting torque calculating section 40*i*.

Then, the program goes to S113 where a final front-rear differential limiting torque Tlsdctr is calculated by summing up the first front-rear differential limiting torque Tsmcctr, the second front-rear differential limiting torque Tpcctr and the initial torque Ti according to the formula (6) in the front-rear differential limiting torque calculating section 40j and then goes to S114 where a signal indicative of hydraulic pressure for producing this final front-rear differential limiting torque Tlsdctr is outputted to the center differential clutch drive section 41, leaving the routine.

Thus, according to the embodiment, since a differential limiting torque inputted by manual operation is corrected by traveling conditions and road surface conditions, an optimum maneuverability reflecting a driver's intention can be obtained.

In this embodiment, the power distribution control between front and rear wheels, that is, the control of the transfer clutch 21 provided between front and rear drive shafts is described, however the principle of the present invention can be applied to the control of the rear differential clutch 23 or the front differential clutch 27.

The entire contents of Japanese Patent Application No. Tokugan 2002-228997 filed Aug. 6, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A power distribution control apparatus of a vehicle for distributing an input torque transmitted through an input shaft into a first output torque and a second output torque through a first output shaft and a second output shaft, respectively by means of a differential mechanism and for controlling a distribution ratio of said first output torque to said second output torque by controlling an engagement force of a clutch mechanism provided between said first output shaft and said second output shaft, comprising:
   target differential rotation speed establishing means for selectively establishing a target differential rotation speed between said first and second output shafts;
   actual differential rotation speed detecting means for detecting an actual differential rotation speed between said first and second output shafts; and
   differential limiting torque establishing means for selectively establishing a differential limiting torque of said clutch at least based on said target differential rotation speed, said actual differential rotation speed and a deviation between said target differential rotation speed and said actual differential rotation speed.

2. The power distribution control apparatus according to claim 1, wherein said clutch mechanism is provided between said first output shaft connected with front wheels and said second output shaft connected with rear wheels.

3. The power distribution control apparatus according to claim 1, wherein said target differential rotation speed is established by a variable dial.

4. The power distribution control apparatus according to claim 1, wherein said clutch mechanism is provided between said first output shaft connected with a left wheel and said second output shaft connected with a right wheel.

5. The power distribution control apparatus according to claim 1, wherein said differential limiting torque establishing means include first differential limiting torque calculating means for calculating a first differential limiting torque at least based on a time-versus integration of said deviation, second differential limiting torque calculating means for calculating a second differential limiting torque based on said deviation and a proportional term gain selectively established, and a third differential limiting torque establishing means for selectively establishing an initial torque at least based on a throttle opening angle and finally establish said differential limiting torque by summing up said first differential limiting torque, said second differential limiting torque and said initial torque.

6. The power distribution control apparatus according to claim 5, wherein said proportional term gain is established by a variable dial.

7. A vehicular power distribution control method of distributing an input torque transmitted through an input shaft into a first output torque and a second output torque through a first output shaft and a second output shaft, respectively by means of a differential mechanism and controlling a distribution ratio of said first output torque to said second output torque by controlling an engagement force of a clutch mechanism provided between said first output shaft and said second output shaft, comprising the steps of:
   selectively establishing a target differential rotation speed between said first and second output shafts;
   detecting an actual differential rotation speed between said first and second output shafts; and
   selectively establishing a differential limiting torque of said clutch mechanism at least based on said target differential rotation speed, said actual differential rotation speed and a deviation between said target differential rotation speed and said actual differential rotation speed.

8. A power distribution control apparatus of a vehicle for distributing an input torque transmitted through an input shaft into a first output torque and a second output torque through a first output shaft and a second output shaft, respectively by means of a differential mechanism and for controlling a distribution ratio of said first output torque to said second output torque by controlling an engagement force of a clutch mechanism provided between said first output shaft and said second output shaft, comprising:
   a target differential rotation speed establishing section that establishes a target differential rotation speed between said first and second output shafts;
   an actual differential rotation speed detecting section that determines an actual differential rotation speed between said first and second output shafts; and
   a differential limiting torque establishing section that establishes a differential limiting torque of said clutch at least based on said target differential rotation speed, said actual differential rotation speed and a deviation between said target differential rotation speed and said actual differential rotation speed.

9. The power distribution control apparatus according to claim 8, wherein said clutch mechanism is provided between said first output shaft connected with a left wheel and said second output shaft connected with a right wheel.

10. The power distribution control apparatus according to claim 8, wherein said clutch mechanism is provided between said first output shaft connected with front wheels and said second output shaft connected with rear wheels.

11. The power distribution control apparatus according to claim 8, wherein said target differential rotation speed is established by a variable dial.

12. The power distribution control apparatus according to claim 8, wherein said differential limiting torque establishing section includes a first differential limiting torque calculating section which calculates a first differential limiting torque at least based on a time-versus integration of said deviation, a second differential limiting torque calculating section that calculates a second differential limiting torque based on said deviation and a proportional term gain selectively established, and a third differential limiting torque establishing section that establishes an initial torque at least based on a throttle opening angle and establishes said differential limiting torque by using said first differential limiting torque, said second differential limiting torque and said initial torque in a calculation.

13. The power distribution control apparatus according to claim 12, wherein said proportional term gain is established by a variable dial.

\* \* \* \* \*